(12) United States Patent
Murakami

(10) Patent No.: US 8,306,398 B2
(45) Date of Patent: Nov. 6, 2012

(54) RECORDING CONTROL APPARATUS AND RECORDING CONTROL METHOD

(75) Inventor: Hirofumi Murakami, Kanagawa (JP)

(73) Assignee: Sony Corporation (JP)

( * ) Notice: Subject to any disclaimer, the term of this patent is extended or adjusted under 35 U.S.C. 154(b) by 1193 days.

(21) Appl. No.: 12/001,509

(22) Filed: Dec. 12, 2007

(65) Prior Publication Data

US 2008/0145035 A1    Jun. 19, 2008

(30) Foreign Application Priority Data

Dec. 13, 2006   (JP) ............................... P2006-335571

(51) Int. Cl.
*G11B 27/00*   (2006.01)
*G11B 27/36*   (2006.01)
*G11B 27/34*   (2006.01)

(52) U.S. Cl. ........................... 386/278; 715/723; 360/13

(58) Field of Classification Search ................. 386/124, 386/278
See application file for complete search history.

(56) References Cited

U.S. PATENT DOCUMENTS

| 4,428,001 A | 1/1984 | Yamamura et al. | |
|---|---|---|---|
| 2002/0093571 A1* | 7/2002 | Hyodo ........................... | 348/220 |
| 2003/0215212 A1 | 11/2003 | Furukawa et al. | |
| 2006/0072901 A1* | 4/2006 | Ando et al. ..................... | 386/69 |
| 2006/0112124 A1* | 5/2006 | Ando et al. ................. | 707/101 |

FOREIGN PATENT DOCUMENTS

| JP | 11120746 A | 4/1999 |
|---|---|---|
| JP | 2006107640 A | 4/2006 |
| JP | 2006107646 A | 4/2006 |

* cited by examiner

*Primary Examiner* — Kambiz Zand
*Assistant Examiner* — Imhotep Durham
(74) *Attorney, Agent, or Firm* — Lerner, David, Littenberg, Krumholz & Mentlik, LLP

(57) ABSTRACT

A randomly accessible storage medium stores unit data including a data body portion including data units, and a management information portion. New data is additionally recorded in the unit data from a predetermined position within the data body portion so that a beginning portion of the new data is additionally recorded in a leading additional recording area extending from the additional recording start position to an end position within a data unit including the additional recording start position. A subsequent portion of the new data is recorded in a physical storage area on the storage medium. The management information portion is updated according to the additionally recorded new data and recorded in the storage medium. The resulting unit data includes a new data body portion starting from the beginning of the previous data body portion and ending in the end of the new data, and the updated managing information portion.

8 Claims, 11 Drawing Sheets

MXF VIDEO-ONLY FILE

MXF AUDIO-ONLY FILE

RECORDING DATA FOR VIDEO-ONLY FILE

RECORDING CONTROL APPARATUS AND RECORDING CONTROL METHOD

CROSS-REFERENCE TO RELATED APPLICATIONS

The present application claims priority from Japanese Patent Application No. JP 2006-335571, filed in the Japanese Patent Office on Dec. 13, 2006, the entire content of which is incorporated herein by reference.

BACKGROUND OF THE INVENTION

1. Field of the Invention

The present invention relates to a recording control apparatus suitable for video and audio editing, such as editing data recorded on a storage medium so that new data is additional recorded on the data, and to a method for the recording control apparatus.

2. Description of the Related Art

In professional video camera apparatuses and their peripheral products such as editing products (video-related products) for use in professional applications such as broadcasting, it is common to use tape-shaped recording media to handle video information obtained by capturing images. However, with the recent increase in the storage capacity of optical disk-shaped storage media sufficient for professional photography applications and advances of compression coding techniques, professional video-related products using optical disk-shaped storage media have been being developed. Such professional video products, therefore, also enjoy advantages of disk-shaped storage media, such as no degradation of the quality of recorded data and compactness of storage media.

In general, video information recorded on randomly accessible storage media such as optical disk-shaped recording media is edited by performing operations such as copying and storing video data to be edited onto a storage medium such as a hard disk drive (HDD) of a computer system, and operating editor application software to, for example, link desired segments (or scenes) picked up from the stored video information. This type of editing is referred to as non-linear editing. Non-linear editing is an editing method suitable for an environment where, as described above, video information is converted in a digital form and stored in randomly accessible storage media. Non-linear editing is more easy-to-use for general users and allows users to create an enjoyable editing experience. Further, the same final results as those obtained by linear editing can be obtained by non-linear editing. Therefore, consumer video editing products based on non-linear editing, such as application software, have been available.

In professional video applications, however, linear editing has been more common for a long time. The reason is as follows. First, tape-shaped recording media are mainstream storage media, which are suitable for linear editing. Second, short-term editing is demanded for limited work time before, for example, the start of a broadcast program. A linear editing operation is an intuitive and quick way to obtain an editing result for experts, and therefore is still useful in the video-related field.

In view of such a situation, editing tools based on linear editing have been widely used in professional video-related products.

Assemble editing is a typical linear editing method, and is an editing technique in which, basically, desired scenes of video information recorded on different tape-shaped recording media (video tape cassettes) are collectively recorded on a single tape cassette called a master tape. In assemble editing, for example, video is dubbed from a first tape cassette to a master tape by duplicating a desired scene and an extra portion after the end of the desired scene, and another video is dubbed from a second tape to the master tape by returning a dubbing position on the master tape to the end of the previous video scene and duplicating a subsequent video scene.

SUMMARY OF THE INVENTION

In the situation described above, for example, when video-related products compatible with optical disk-shaped storage media, in particular, editing products, becomes widespread in the field of professional video-related products, the following problem occurs.

That is, optical disk-shaped storage media are randomly accessible storage media, and are basically suitable for non-linear editing but is not designed for linear editing. In the current situation, no professional products for handling video recordings on optical disk-shaped storage media, which are exactly appropriate for linear editing such as assemble editing, have been available.

In the field of professional video products, therefore, there arises a problem in that even if new video-related products compatible with optical disk-shaped storage media are purchased, it is difficult to perform existing linear editing using such video-related products. One solution of this problem is that, as is to be understood, non-linear editing is performed when the video-related products compatible with optical disk-shaped storage media are used. However, as described above, due to the editing process, linear editing may be inevitable in an environment where professional video products are used, and it is not desirable to completely migrate editing systems to non-linear editing.

According to an embodiment of the present invention, there is provided a recording control apparatus including the following elements. A first data recording section is configured to additionally record new data in unit data stored on a randomly accessible storage medium from an additional recording start position, the unit data having a sequence of units segmented according to a predetermined data size, the unit data including a data body portion in which data is stored so as to be divided according to the segmented units and a management information portion arranged subsequent to the data body portion, the additional recording start position being a predetermined position within a range from a start position of the data body portion to an end position of the data body portion, wherein data recording on the storage medium is performed so that a beginning portion of the new data is additionally recorded in a leading additional recording area extending from the additional recording start position to an end position within one of the segmented units that includes the additional recording start position, the beginning portion having a data size equal to a data size of the leading additional recording area. A second data recording section is configured to record a subsequent portion of the new data subsequent to the beginning portion in a physical storage area on the storage medium other than a physical storage area in which the unit data is recorded before the new data is additionally recorded. A management information recording section is configured to update the management information portion so as to reflect the new data additionally recorded by the first data recording section and the second data recording section, and to physically record data indicating the updated management information portion in the storage medium. A storage medium managing section is configured to manage content stored in the storage medium so that the unit data that has been additionally recorded with the new data by the first data recording section and the second data recording section includes a new data body portion that starts from the beginning of the data body portion recorded before additional recording and that ends in the end of the additionally recorded new data, and the updated managing information portion subsequent to the new data body portion.

In the above-described structure, unit data having a data body portion including a sequence of segmented units with a predetermined size, and a management information portion, which is already recorded on a randomly accessible storage medium, is handled as an edit source, and an editing operation is performed so that data is additionally recorded (or added) from an intermediate position within the data body portion as a start position. In the additional recording process, first, data recording is performed so that a beginning portion of new data is additionally recorded onto a segmented unit including an additional recording start position, and then, a remaining portion of the new data is recorded in a storage area on the storage medium other than a physical storage area including the unit data that has not been additionally recorded with the new data. Further, along with the recording of the new data, the management information portion in which the additionally recorded new data is reflected (updated management information portion) is recorded on the storage medium. The storage medium is managed so that unit data including a data body portion that starts from the beginning of the same data body portion as that of the unit data that has not been additionally recorded with the new data and that ends in the end of the additionally recorded new data, and the updated management information portion is defined on the storage medium. According to an embodiment of the present invention, therefore, a recording in which new data is overwritten from an intermediate position of data that is already recorded on a randomly accessible storage medium can be obtained. That is, a data recording operation corresponding linear editing called assemble editing can be achieved.

Therefore, an embodiment of the present invention allows data recording using linear editing (assemble editing), which is difficult for random access storage media. This encourages operators to actively use products compatible with random access storage media in an environment or situation where linear editing is demanded, and is expected to enjoy and fully utilize the advantages of random access storage media.

DESCRIPTION OF THE PREFERRED EMBODIMENTS

Figure 1:
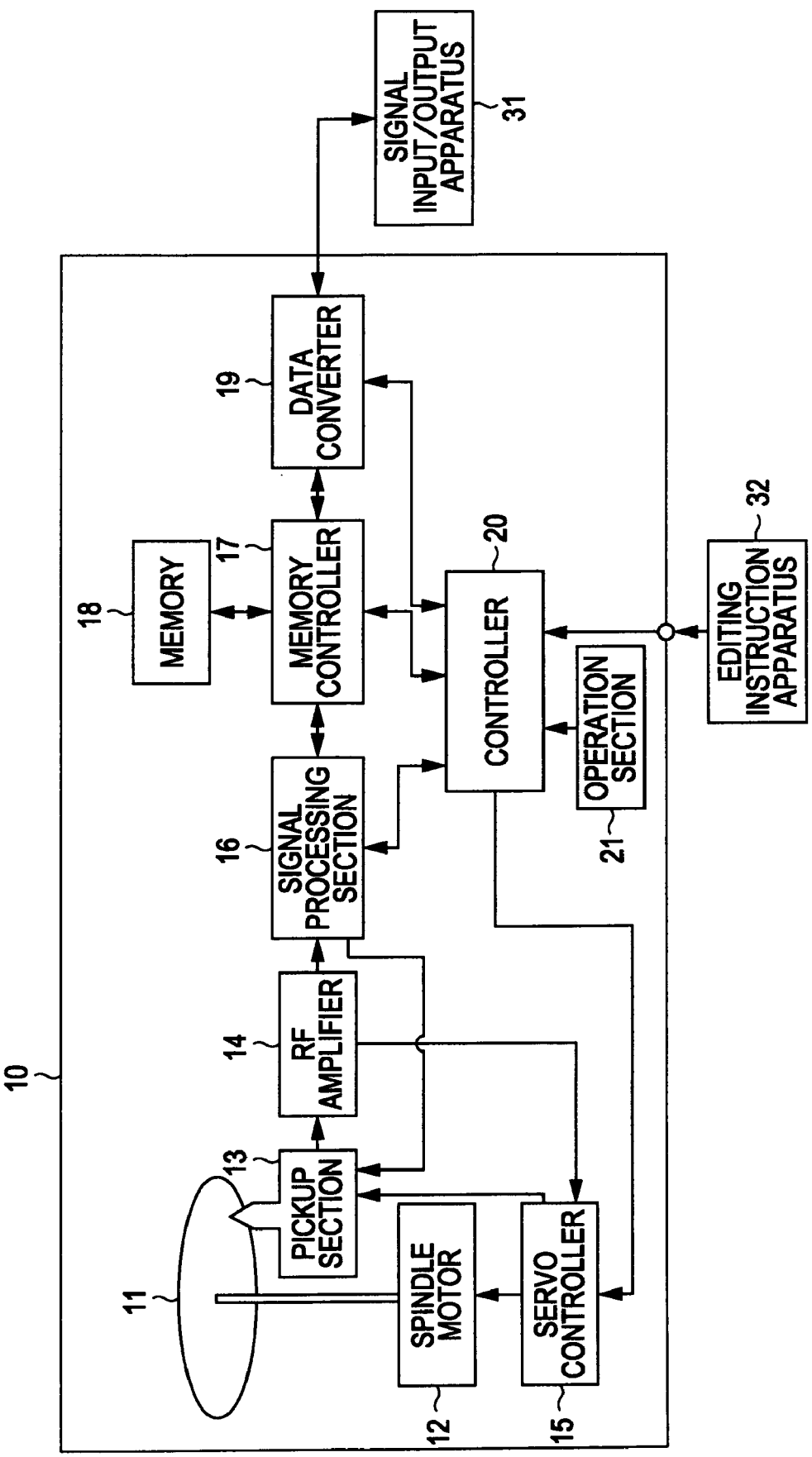
FIG. 1 is a diagram showing an example structure of a disk recording and reproducing apparatus according to an embodiment of the present invention.

FIG. 1 shows an example structure of a disk recording and reproducing apparatus 10 according to an embodiment of the present invention. The disk recording and reproducing apparatus 10 has a structure of a recording control apparatus according to an embodiment of the present invention. The disk recording and reproducing apparatus 10 has a function as an editor for editing video and audio information composed of, for example, video information and audio information to be reproduced synchronously with the video information.

Referring to FIG. 1, a spindle motor 12 drives an optical disk 11 to rotate at a constant linear velocity (CLV) or constant angular velocity (CAV) on the basis of a spindle motor driving signal output from a servo controller 15.

A pickup section 13 outputs a recording laser beam on the basis of a recording signal supplied from a signal processing section 16 to record a signal onto the optical disk 11, and radiates the laser beam to focus on the optical disk 11. Further, the pickup section 13 photoelectrically converts a beam reflected from the optical disk 11 to generate a current signal, and supplies the current signal to a radio-frequency (RF) amplifier 14. The irradiation position of the laser beam is controlled to be a predetermined position by a servo control signal supplied from the servo controller 15 to the pickup section 13.

The RF amplifier 14 generates a focus error signal, a tracking error signal, and a reproduction signal on the basis of the current signal supplied from the pickup section 13. The tracking error signal and the focus error signal are input to the servo controller 15, and the reproduction signal is input to the signal processing section 16.

The servo controller 15 performs servo control such as focus servo control and tracking servo control. For example, the servo controller 15 generates a focus servo control signal and a tracking servo control signal on the basis of the focus error signal and tracking error signal input from the RF amplifier 14, respectively, and outputs the generated signals to an actuator (not shown) of the pickup section 13. The servo controller 15 also generates a spindle motor driving signal for driving the spindle motor 12, and performs spindle servo control for rotating the optical disk 11 at a predetermined rotation speed.

The servo controller 15 also performs sled control for moving the pickup section 13 along the diameter of the optical disk 11 to move the irradiation position of the laser beam.

A signal read position (or address) at which a signal (or data) is read from the optical disk 11 is specified by a controller 20, and the irradiation position of the laser beam on the optical disk 11 is controlled so as to involve the sled control to read the signal from the specified read position.

In a recording operation, the signal processing section 16 performs recording modulation on recording data input from a memory controller 17 to generate a recording signal, and supplies the recording signal to the pickup section 13. In a reproduction operation, the signal processing section 16 performs demodulation on the reproduction signal from the RF amplifier 14 to obtain reproduction data, and supplies the reproduction data to the memory controller 17.

The memory controller 17 writes recording data output from a data converter 19 in a memory 18 for temporary storage, as described below, and reads and outputs the recording data to the signal processing section 16. The memory controller 17 further writes the reproduction data transferred from the signal processing section 16 in the memory 18 for temporary storage, as necessary, and reads and outputs the reproduction data to the data converter 19.

The data converter 19 performs compression coding on video and audio information input from a signal input/output apparatus 31 using a predetermined compression coding scheme, as necessary, and transfers the resulting video and audio information to the memory controller 17. The video and audio information is composed of, for example, an image and sound captured and recorded by a video camera (not shown) and stored in a storage medium of the video camera, or is video and audio information reproduced from a storage medium (not shown) by another video apparatus or the like.

The data converter 19 further decodes (or expands) the video and audio reproduction data transferred from the memory controller 17, as necessary, using a scheme corresponding to the compression coding scheme to convert it into video and audio signals complying with a predetermined signal format, and outputs the video and audio signals to the signal input/output apparatus 31.

The controller 20 controls the servo controller 15, the signal processing section 16, the memory controller 17, and the data converter 19 to perform a recording and reproduction operation.

The controller 20 has a structure of, for example, a microcomputer, and includes a central processing unit (CPU) and a storage device such as a read-only memory (ROM), a random access memory (RAM), or a flash memory.

An operation section 21 includes, for example, various handlers disposed on a main unit of the disk recording and reproducing apparatus 10, and an operation signal output section that generates an operation signal in accordance with an operation performed on the handlers and that outputs the operation signal to the controller 20 (CPU). The controller 20 performs desired control processing to perform an operation responsive to the input operation signal.

In the structure described above, for example, the flow of a recording signal when video and audio signals (or data) are recorded is as follows.

First, the recording data is input from the signal input/output apparatus 31. The video and audio signals serving as the input recording data are subjected to processing such as compression coding by the data converter 19, and is temporarily stored in the memory 18 under control of the memory controller 17. Then, the video and audio signals are retrieved and output to the signal processing section 16. The recording data input to the signal processing section 16 is subjected to recording modulation processing, and is output as a recording signal to the pickup section 13. The pickup section 13 irradiates the optical disk 11 with a laser beam in accordance with the input recording signal, and data is recorded on the optical disk 11.

In a reproduction operation, a signal stored on the optical disk 11 is retrieved by the pickup section 13 as a current signal. The current signal is converted into a binarized reproduction signal by the RF amplifier 14, and is subjected to demodulation processing corresponding to the recording modulation by the signal processing section 16. The resulting signal is transferred as video and audio reproduction signal data to the memory controller 17. The memory controller 17 outputs the transferred reproduction signal data to the data converter 19 via the memory 18. The reproduction signal data input to the data converter 19 is subjected to, for example, expansion processing corresponding to the compression coding, as necessary, into video and audio signals in a predetermined format, and is then output to the signal input/output apparatus 31.

The data recorded on and reproduced from the optical disk 11 in the manner described above is managed by a predetermined file system. The controller 20 performs file system control according to a program.

The disk recording and reproducing apparatus 10 is connectable to an editing instruction apparatus 32.

In the field of professional video products, an editing apparatus like the disk recording and reproducing apparatus 10 of the present embodiment is a recorder, and the editing instruction apparatus 32 is an apparatus peripheral to a recorder, such as an editor.

The editing instruction apparatus 32 is basically compatible with an apparatus that is of an earlier generation than the disk recording and reproducing apparatus 10 of the present embodiment, such as a recorder compatible with magnetic tape-shaped recording media, and is configured to cause the recorder to perform a recording and reproduction operation using predetermined editing such as linear editing, e.g., assemble editing, and to output a corresponding instruction (or command) to the recorder.

For example, upon receiving an instruction output from the editing instruction apparatus 32, the controller 20 performs control processing to perform an operation responsive to the received instruction.

A data format (or file format) according to which data is recorded on the optical disk 11 will now be described with reference to FIGS. 2A to 5.

The optical disk 11 has stored therein video and audio information (or video and audio data) composed of video content and audio content to be reproduced synchronously with the video content. In the present embodiment, the video and audio information is recorded and reproduced using a material exchange format (MXF) scheme.

Figure 2A:
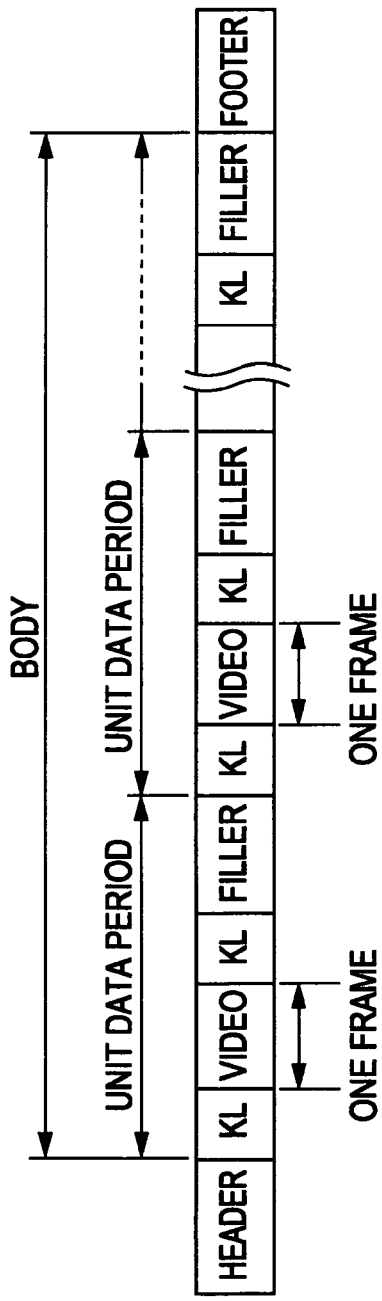
FIGS. 2A to 2C are data structure diagrams showing a file (clip) format supported by the disk recording and reproducing apparatus according to the embodiment.

FIG. 2A shows an example structure of a file of video only (video-only file) as an MXF file (single essence). The video-only file is configured such that a header, a body, and a footer are concatenated in the stated order from the beginning. The body contains video data. The body is segmented into unit data periods by a constant amount of data. As shown in FIG. 2A, each of the unit data periods is composed of a KL (universal label (UL) key and length) portion, a video data portion corresponding to one frame, a KL portion, and a filler. MXF uses a UL key-length-value structure, called a KLV structure. A KL portion at the beginning of each unit data period is a UL key and length area that defines a video data portion subsequent thereto as a value. A KL portion immediately before a filler in each unit data period is also a UL key and length area that defines the filler as a value. The filler is a region for filling a portion insufficient for each unit data period to have the prescribed size. As described above, since the video data portion in each unit data period corresponds to one frame, each unit data period is also segmented in accordance with one frame.

Figure 2B:
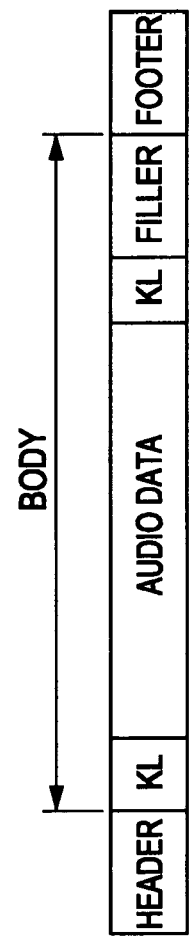

FIG. 2B shows an example structure of a file of audio only (audio-only file) as an MXF file (single essence).

The audio-only file is also configured such that a header, a body, and a footer are concatenated in the stated order from the beginning. Unlike video data, however, audio data has no concept of frame-by-frame segmentation, and the body contains a single sequence of portions in the manner shown in FIG. 2B. In accordance with the unit data periods shown in FIG. 2A, a KL portion that defines an audio data portion as a value is placed at the beginning of the body, and a KL portion that defines a filler as a value is placed immediately before the filler.

Figure 2C:
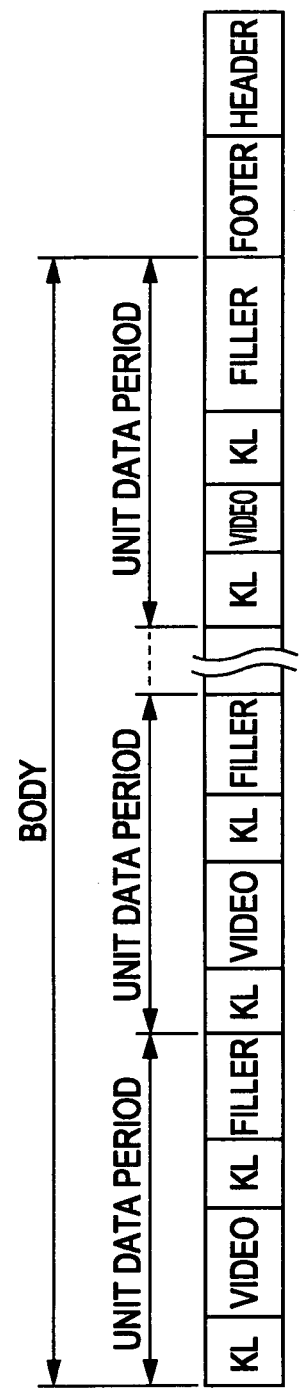

For example, when a video-only file having the structure shown in FIG. 2A is actually recorded on the optical disk 11, the video-only file is converted into recording data with a structure shown in FIG. 2C. That is, the body is placed at the beginning of a file, followed by the footer and the header, thereby forming the file. The header is placed at the end of the file due to the following reasons. The content of the header is changed so as to reflect a recording result of the file. In a recording operation, therefore, the header is recorded at the time when the recording of the data of the body has been completed. In the structure shown in FIG. 2C, the body is recorded, and then the footer is recorded, after which the header can be directly recorded, resulting in efficient data writing. In a reproduction operation, conversely, it is difficult to read the header using a normal reproduction procedure because the header is not placed at the beginning of the file. In the actual file format according to the present embodiment, it is defined that management information concerning files recorded in a disk, such as Index.htm, is recorded in a region different from that in which the files are recorded. Such management information contains information associated with each of the files. The management information is referred to, thereby allowing file reproduction without failure.

In FIG. 2A, the size of each unit data period is specified on the basis of the size of video data of one frame stored therein. In FIG. 2C, on the other hand, the size of each unit data period is specified so as to be equal to the size (e.g., 64 KB) of a recording unit block (RUB), which is a unit by which data is written in the optical disk 11. Therefore, video data stored in each unit data period has a data size corresponding to a predetermined reproduction time length instead of one frame. In this case, video data whose size is smaller than the prescribed size may be stored in a unit data period at the end of the file. In such a case, for example, as shown in FIG. 2C, a filler with the corresponding data size (and a KL portion associated therewith) is embedded in the remaining area to satisfy the size of each RUB.

Figure 3:
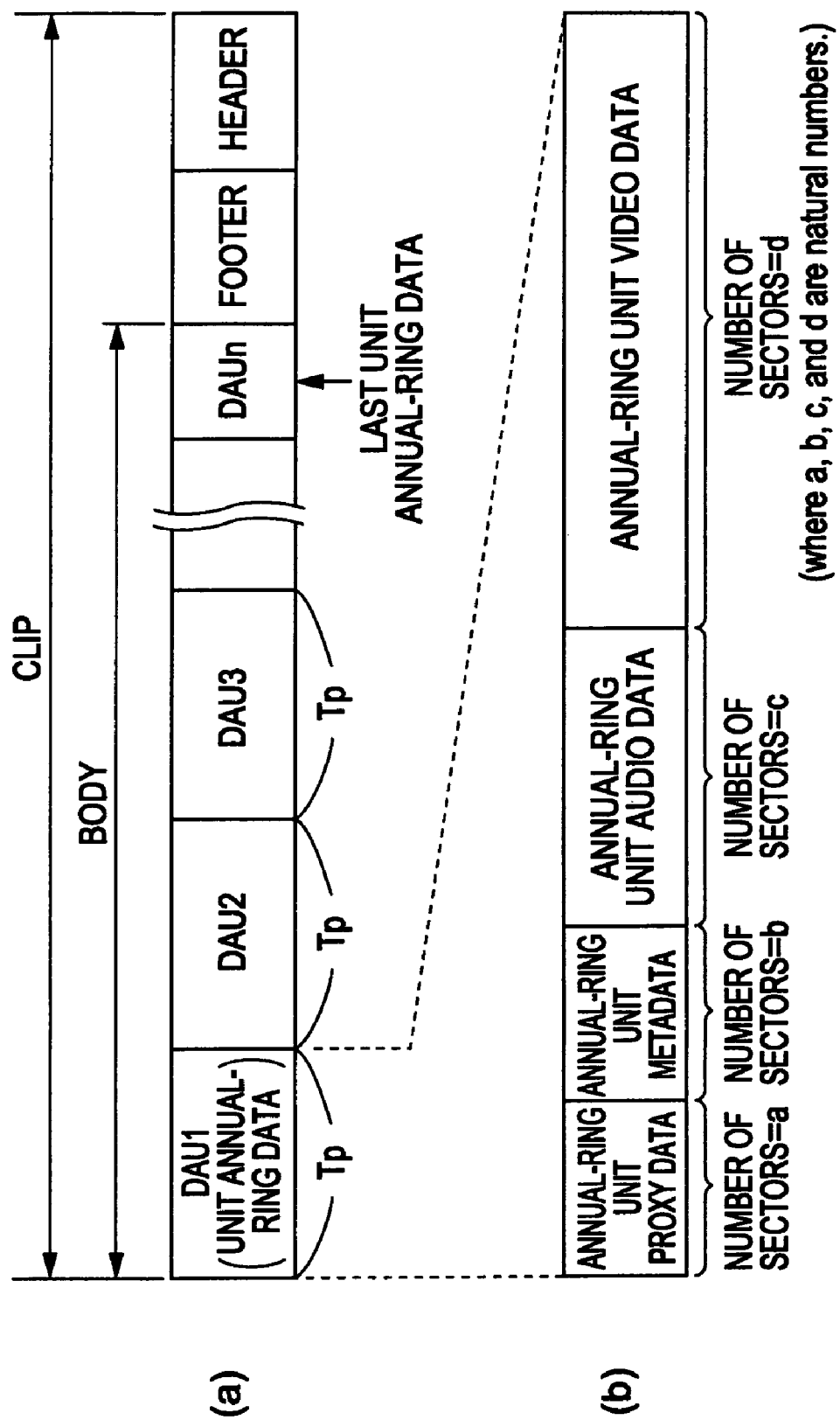
FIG. 3 is a diagram showing an example structure of a file (clip) to be written in an optical disk according to the file format supported by the disk recording and reproducing apparatus according to the embodiment.

FIG. 3 shows an example structure of data actually recorded on the optical disk 11.

A plurality of data series is defined to be actually recorded on the optical disk 11, including video data and audio data to be reproduced synchronously with the video data. Proxy data and metadata are also defined as the data series to be recorded on the optical disk 11.

Proxy data is data having reproduction content, which is the same as that of the video data, with a lower resolution and having a video signal format different from that of the video data. The proxy data is used to check recorded data during, for example, editing. Metadata is additional information concerning the video and audio data in the corresponding period.

Unit data corresponding to a file actually recorded on the optical disk 11 is referred to as a clip shown in part (a) of FIG. 3. The clip is configured according to the structure shown in FIG. 2C such that a body is placed at the beginning, followed by a footer and a header.

The body is formed as a concatenation of unit annual-ring data units each corresponding to a unit period. Each of the unit annual-ring data units, except for the last unit annual-ring data unit placed at the end of the body, contains video and audio data corresponding to a predetermined reproduction time Tp, and proxy data and metadata associated therewith. As shown in part (b) of FIG. 3, each unit annual-ring data unit is configured such that annual-ring unit proxy data, annual-ring unit metadata, annual-ring unit audio data, and annual-ring unit video data are arranged in the stated order from the beginning. The etymological origin of the term "annual-ring unit", which refers to each of the data periods, is described below.

The annual-ring unit video data placed at the end of each unit annual-ring data unit is data that is formed by, for example, concatenating video data portions with a size corresponding to the reproduction time Tp, which are extracted from the unit data periods of the recording data of the video-only file shown in FIG. 2C, according to the time-series order.

Although not shown in FIG. 2C, an audio-only file is also provided as recording data of audio data. The audio-only file is based on, for example, the audio-only file shown in FIG. 2B, and is configured such that a body, a footer, and a header are arranged in the stated order from the beginning.

The annual-ring unit audio data placed immediately before the annual-ring unit video data is obtained by extracting the audio data periods, each corresponding to the reproduction time Tp, to be reproduced synchronously with the annual-ring unit video data from the body of the audio-only file.

The annual-ring unit proxy data contains low-resolution video data having the same content as the annual-ring unit video data in the same unit annual-ring data unit, for example, video data generated on the basis of the annual-ring unit video data.

The annual-ring unit metadata contains metadata that is generated for the annual-ring unit video data and annual-ring unit audio data in the same unit annual-ring data unit.

The annual-ring unit proxy data, the annual-ring unit metadata, the annual-ring unit audio data, and the annual-ring unit video data, which constitute each unit annual-ring data unit in the manner described above, have sizes corresponding to the number of sectors a, the number of sectors b, the number of sectors c, and the number of sectors d, respectively. Variables a, b, c, and d each indicating the number of sectors are natural numbers. Therefore, if each of the annual-ring unit data units is recorded starting from the beginning of a sector on the optical disk 11, the end of the annual-ring unit data unit is positioned at a boundary between sectors (i.e., the end of the sector) rather than at the middle of the sector.

Figure 4:
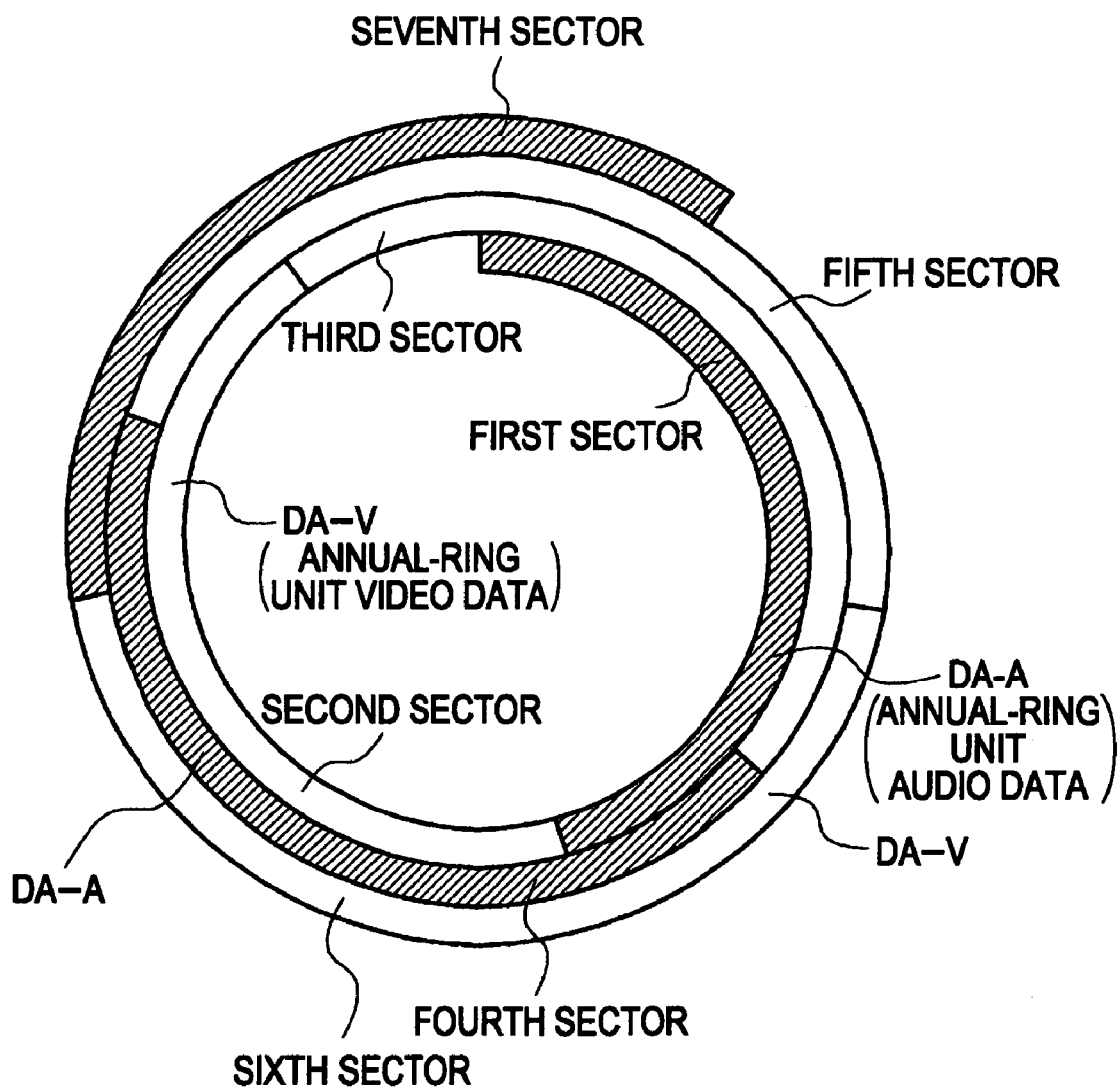
FIG. 4 is a diagram showing a basic concept of physically writing data in the optical disk according to the embodiment.

FIG. 4 shows a basic concept of physically writing data in the optical disk 11.

In FIG. 4, a physical structure of the optical disk 11 is shown with respect to a track portion in which the first to seventh sectors are consecutively formed from the inner circumference side to the outer circumference side.

Here, it is assumed that data to be recorded on the optical disk 11 includes video data and audio data to be reproduced synchronously with the video data.

On the optical disk 11, each of the video data and the audio data is separately divided by the same reproduction time. The segmented video and audio data portions have sizes that are an integer multiple of the number of sectors formed on the optical disk 11. Therefore, each of the segmented video and audio data portions has the annual-ring unit data structure shown in part (b) of FIG. 3. That is, the recording of the optical disk 11 is performed on the basis of the annual-ring unit data.

For the convenience of description, the sizes of the annual-ring unit video data and annual-ring unit audio data corresponding to the same reproduction time Tp are two sectors and one sector, respectively.

In FIG. 4, first, annual-ring unit audio data DA-A is recorded in the first sector, and annual-ring unit video data DA-V is recorded in two consecutive sectors subsequent to the first sector, namely, the second and third sectors. In the example shown in FIG. 4, proxy data and metadata are omitted, and the annual-ring unit audio data DA-A and annual-ring unit video data DA-V recorded in the three, first to third sectors constitute one unit annual-ring data unit. The above operation is periodically repeated for the subsequent sectors. That is, annual-ring unit audio data DA-A is recorded in the fourth sector and annual-ring unit video data DA-V is recorded in the fifth and sixth sectors to constitute a unit annual-ring data unit, and a similar recording operation is performed for the seventh and following sectors. As described above, what is to be focused on is that the size of each of the annual-ring unit video data DA-V and the annual-ring unit audio data DA-A is an integer multiple of the number of sectors. Since the recording of data is started from the beginning of a sector, the end of the data is recorded so as to be positioned at a boundary between sectors (i.e., the end of the sector).

Figure 5:
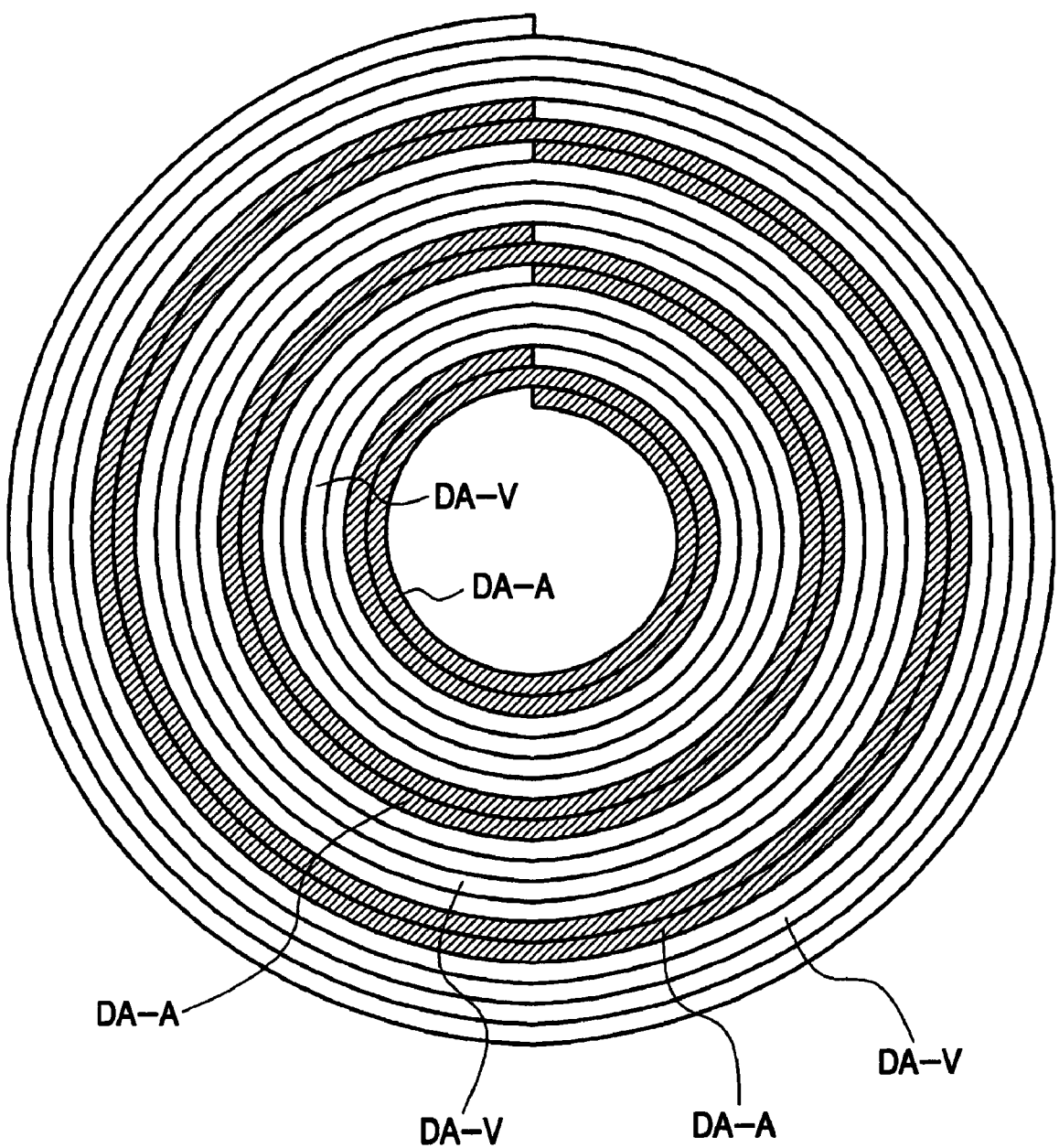
FIG. 5 is a diagram schematically showing an annual-ring pattern by which data is physically written in the optical disk according to the embodiment.

Actually, a larger number of sectors are occupied by each of the annual-ring unit audio data DA-A and the annual-ring unit video data DA-V. FIG. 5 is a diagram showing a more actual image in which data of a clip composed of unit annual-ring data units including only the annual-ring unit audio data DA-A and the annual-ring unit video data DA-V is recorded on the optical disk 11.

According to the image shown in FIG. 5, the annual-ring unit audio data DA-A and the annual-ring unit video data DA-V are recorded in a track so as to form annual rings of a tree. Therefore, unit recording data for each series (or data type) to be recorded on the optical disk 11 is referred to as annual-ring unit data.

As shown in part (b) of FIG. 3, actually, the annual-ring unit proxy data and the annual-ring unit metadata are recorded as annual-ring unit data before the annual-ring unit audio data and the annual-ring unit video data in the manner shown in FIGS. 4 and 5, and those four types of annual-ring unit data constitute recording data of one unit annual-ring data unit. Such recording of data based on the unit annual-ring data units is repeated.

In the present embodiment, the disk recording and reproducing apparatus 10 that records data on the optical disk 11 in the manner described above is configured so as to be capable of performing a recording operation based on assemble editing, as described below. Assemble editing is one of typical linear editing techniques, and is a technique in which, as described above, basically, a tape-shaped recording medium is used and a video sequence is dubbed or additionally recorded onto a master tape while a new video sequence is dubbed over the previously recorded video sequence so as to delete an unnecessary portion of the previous video sequence to create editing results in a time-series order.

Figure 6:
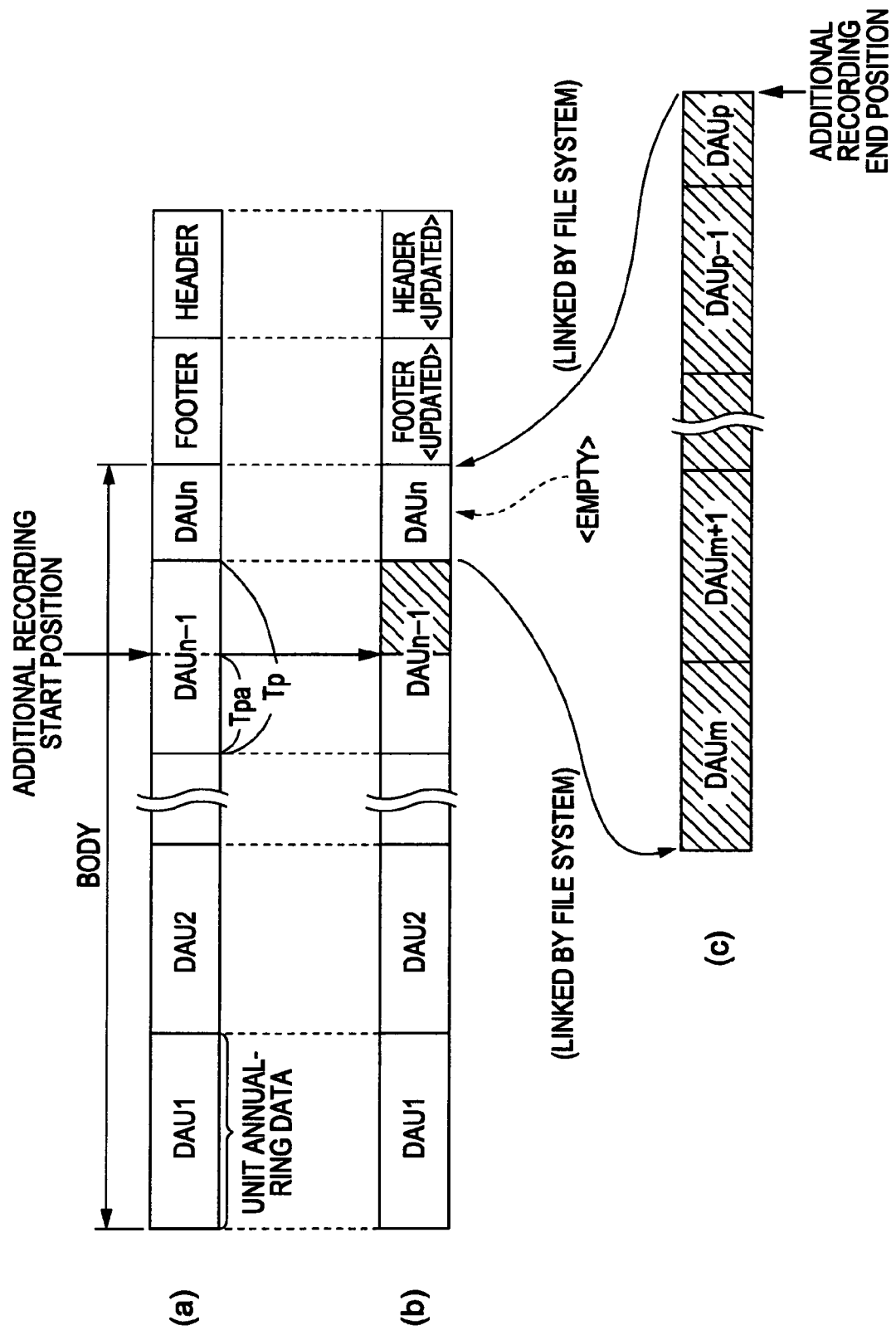
FIG. 6 is a diagram showing an example of a recording procedure for recording new recording data using assemble editing according to the embodiment.

FIG. 6 shows an example of a recording processing for assemble editing, which is performed by the disk recording and reproducing apparatus 10.

A source clip to be edited, which is recorded on the optical disk 11 placed as a master disk in the disk recording and reproducing apparatus 10, is shown in part (a) of FIG. 6. As described above, one clip is composed of a body, followed by a footer and a header. In the example shown in FIG. 6, the body is segmented into units of unit annual-ring data, including unit annual-ring data units DAU1 to DAUn starting from the beginning.

In part (a) of FIG. 6, it is assumed that an additional recording start position from which new recording data is to be additionally recorded (or added) by assemble editing is determined as a data position corresponding to a timing with a lapse of about 60% of the reproduction time Tp within the unit annual-ring data unit DAUn-1.

In an actual additional recording operation based on assemble editing, first, as with that based on assemble editing using a tape-shaped recording medium, reproduction (assisting reproduction) is started from a data position a predetermined time before the determined additional recording start position on the source clip recorded on the master disk. In accordance with the reproduction of the source clip, data to be newly recorded (or new recording data) is also reproduced synchronously with the reproduction of the source clip by, for example, an external apparatus, and is input to the disk recording and reproducing apparatus 10 via the signal input/output apparatus 31. At the time when the reproduction position of the source clip subjected to assisting reproduction reaches the additional recording start position, the disk recording and reproducing apparatus 10 enters an editing recording mode in which the input new recording data is recorded on the optical disk 11. Thus, the new recording data is additionally recorded from the additional recording start position.

Since the new recording data is recorded from the additional recording start position, the unit annual-ring data unit DAUn-1 shown in part (a) of FIG. 6 is changed so that, in view of a logical-structure, as schematically shown in part (b) of FIG. 6, the previous recording data is overwritten with the new recording data after the additional recording start position.

An example of the concept of a recording process for recording data from an intermediate position of the reproduction time Tp in a manner similar to that of the unit annual-ring data unit DAUn-1 described above will now be described with reference to FIG. 8.

Figure 8:
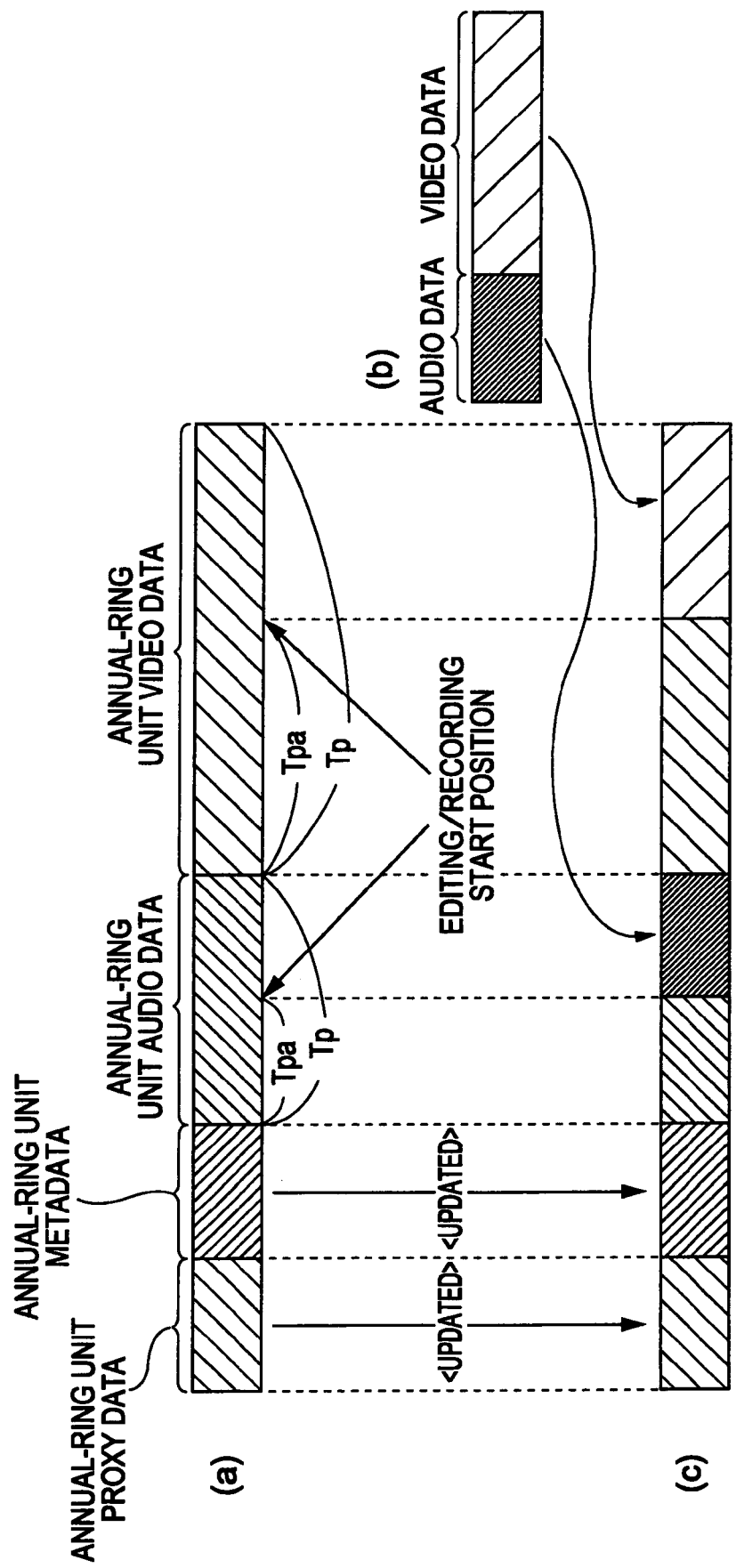
FIG. 8 is a diagram showing an example of additional recording process for an additional-recording-start unit annual-ring data unit shown in FIG. 6 or 7.

Part (a) of FIG. 8 shows the content of the unit annual-ring data unit DAUn-1 shown in part (a) of FIG. 6 before new data is additionally recorded. That is, the annual-ring unit proxy data, the annual-ring unit metadata, the annual-ring unit audio data, and the annual-ring unit video data are arranged in the stated order from the beginning.

Part (b) of FIG. 8 shows a beginning portion of data used to be recorded as new recording data on the unit annual-ring data unit DAUn-1 including the additional recording position. The beginning portion of the data is composed of audio data and video data each having a size corresponding to a reproduction time period ranging from an elapsed reproduction time Tpa corresponding to a position at which additional recording is performed in the unit annual-ring data unit to the expiry of the reproduction time Tp, i.e., given by Tp-Tpa.

In actual unit annual-ring data, the additional recording start position specified in part (a) of FIG. 6 includes two positions shown in part (a) of FIG. 8, i.e., a position with a lapse of the reproduction time Tpa in the annual-ring unit audio data, and a position with a lapse of the reproduction time Tpa in the annual-ring unit video data. The audio data of the new recording data is recorded from the additional recording start position so as to overwrite the annual-ring unit audio data, and the video data of the new recording data is recorded from the additional recording start position so as to overwrite the annual-ring unit video data. As shown as a transition from part (a) of FIG. 8 to part (c) of FIG. 8, the annual-ring unit proxy data and the annual-ring unit metadata are updated according to the above-described recording result.

In this way, the unit annual-ring data including the additional recording start position is updated, thereby obtaining recorded content shown in part (c) of FIG. 8. The recorded content corresponds to the unit annual-ring data unit DAUn−1 shown in part (b) of FIG. 6. That is, only a range from the additional recording start position to the end is overwritten with the new recording data, and in the preceding portion, unit annual-ring data having the same content as that of the source remains.

After the additional recording of the unit annual-ring data including the additional recording start position is completed in the manner described above, the remaining portion of the new recording data is additionally recorded. In the source clip, a physical sector area of the optical disk 11 in which a unit annual-ring data unit subsequent to the unit annual-ring data unit including the additional recording start position is recorded is not designated as a recordable area, and an empty sector is reserved for additionally recording the new recording data starting from an area except for the sector area. Then, the new recording data is recorded in the reserved empty sector. When the new recording data is recorded in the empty sector, for example, the signal processing section 16 performs signal processing according to the control of the controller 20 to generate recording data including annual-ring data units each having the structure shown in part (b) of FIG. 3, and the annual-ring data units are recorded in logically consecutive sectors. Part (c) of FIG. 6 shows unit annual-ring data units DAUm, DAUm+1, . . . , DAUp−1, DAUp (where m<p), which are recording results of the new recording data in such units of unit annual-ring data. In the example shown in part (c) of FIG. 6, the unit annual-ring data unit DAUp is the last recording data unit, and the end position thereof is the current additional recording end position. The unit annual-ring data unit DAUp shown in part (c) of FIG. 6 stores video and audio data of the new recording data whose duration is shorter than the reproduction time Tp at the end of the new recording data.

At the time of completion of the additional recording of the new recording data, the unit annual-ring data unit DAUn, which is a data unit subsequent to the unit annual-ring data unit DAUn−1 in which the additional recording position is designated, the footer, and the header are not overwritten or deleted, and are still physically written and stored in the data constituting the source clip.

Then, the content of the header that is not deleted but is left in the manner described above is updated according to the current recording result of the new recording data. The content of the footer is also updated, if necessary. The updated content of the header and footer is recorded so as to overwrite the original header and footer. That is, the updated header and footer are actually written and recorded in the optical disk 11. This ensures that data of a management information portion (including the header and/or the footer) in which the current recording result of the new recording data is reflected is physically written (recorded) in the optical disk 11.

Then, as a structure of the clip recorded on the optical disk 11, file management information used by the file system is updated according to the following sequence. That is, the overwritten unit annual-ring data units, starting from the unit annual-ring data unit DAU1 up to the unit annual-ring data unit DAUn−1, are sequentially arranged. The unit annual-ring data unit DAUn−1 is followed by the series of unit annual-ring data units DAUm, DAUm+1, . . . , DAUp−1, and DAUp shown in part (c) of FIG. 6, followed by the updated footer and header. The end of the header is set as the end of the file (EOF). The unit annual-ring data unit DAUn in the body of the clip before additional recording is managed as an empty area.

In the clip obtained after completion of the additional recording procedure, the video and audio content of the source clip remains from the beginning to the additional recording start position, and when reaching the reproduction time of the additional recording start position, the content is switched to the additionally recorded video and audio content. That is, content as a result of assemble editing is obtained. In the present embodiment, therefore, assemble editing based on an operation procedure similar to an existing procedure can be performed using the disk recording and reproducing apparatus 10 compatible with randomly accessible storage media.

Figure 7:
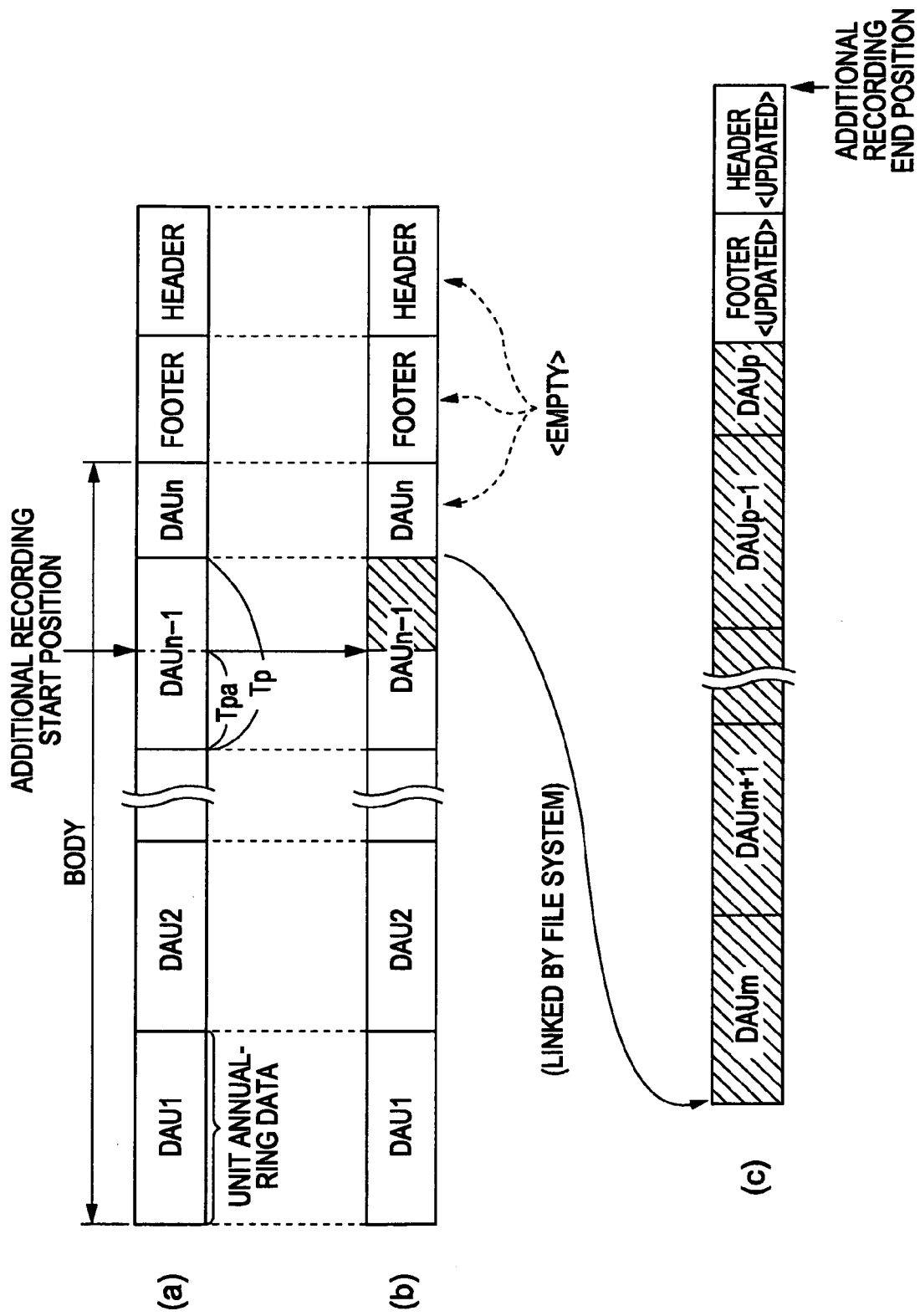
FIG. 7 is a diagram showing another example of the recording procedure for recording new recording data using assemble editing according to the embodiment.

FIG. 7 shows another example of the recording processing for assemble editing according to the present embodiment.

Part (a) of FIG. 7 shows the same source clip as that shown in part (a) of FIG. 6. An additional recording start position is designated at a position similar to that shown in FIG. 6.

A portion of the procedure shown in FIG. 7 for additionally recording new recording data is similar to that shown in FIG. 6. That is, as in the procedure shown in FIG. 6, data of a beginning portion of the new recording data is recorded in the unit annual-ring data unit DAUn−1 including the additional recording start position according to the procedure shown in FIG. 8, and sectors other than a sector in which the data of the source clip subsequent to the unit annual-ring data unit DAUn−1 up to the end is recorded are reserved as empty sectors. Then, the remaining portion of the new recording data is written and recorded as the unit annual-ring data units DAUm, DAUm+1, . . . , DAUp−1, and DAUp.

In FIG. 7, when the writing of the new recording data is completed, the header (and footer) in which the result of the previous additional recording operation is reflected is generated again, and the generated footer and header are also written and recorded in the reserved empty sectors to ensure that the updated management information portion is physically written in the optical disk 11.

In this case, the file system management information is rewritten so that, first, the unit annual-ring data units DAU1 to DAUp are concatenated (which is similar to that shown in FIG. 6), and the footer and header newly written in the empty sectors are subsequently concatenated in the stated order. In this case, further, the unit annual-ring data unit DAUn and sector areas containing the data of the footer and header in the body of the clip before additional recording are managed as empty areas.

The recording procedure shown in FIG. 7 also provides the same recording result as that shown in FIG. 6 when the additional recording has been completed. That is, a result of assemble editing is obtained.

An example of an algorithm (processing procedure) for implementing the recording process based on assemble editing described above with reference to FIGS. 6 and 7 (together with FIG. 8) will be described with reference to flowcharts shown in FIGS. 9 and 10.

Figure 9:
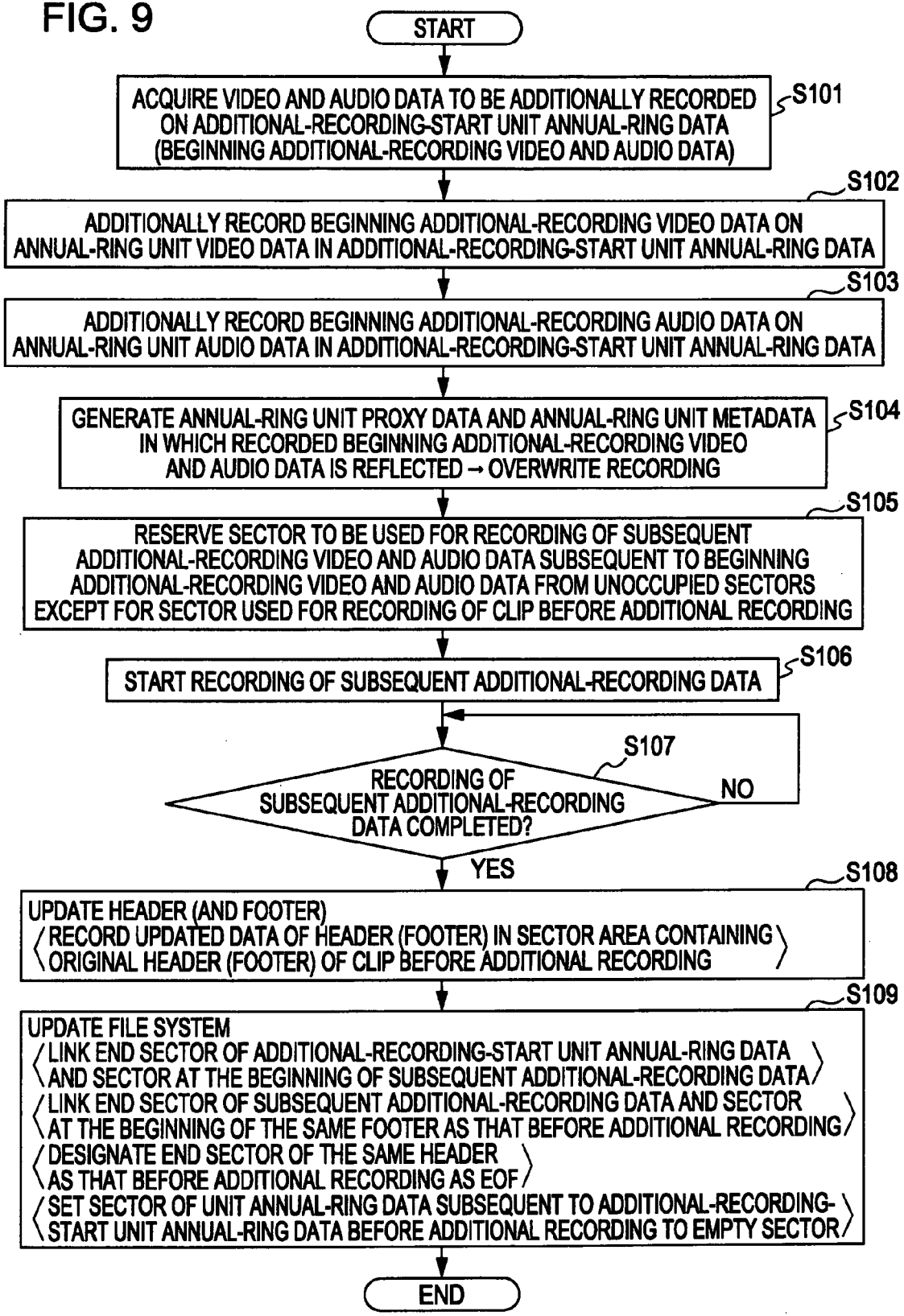
FIG. 9 is a flowchart showing an example of a process performed by a controller according to the recording procedure shown in FIG. 6.
Figure 10:
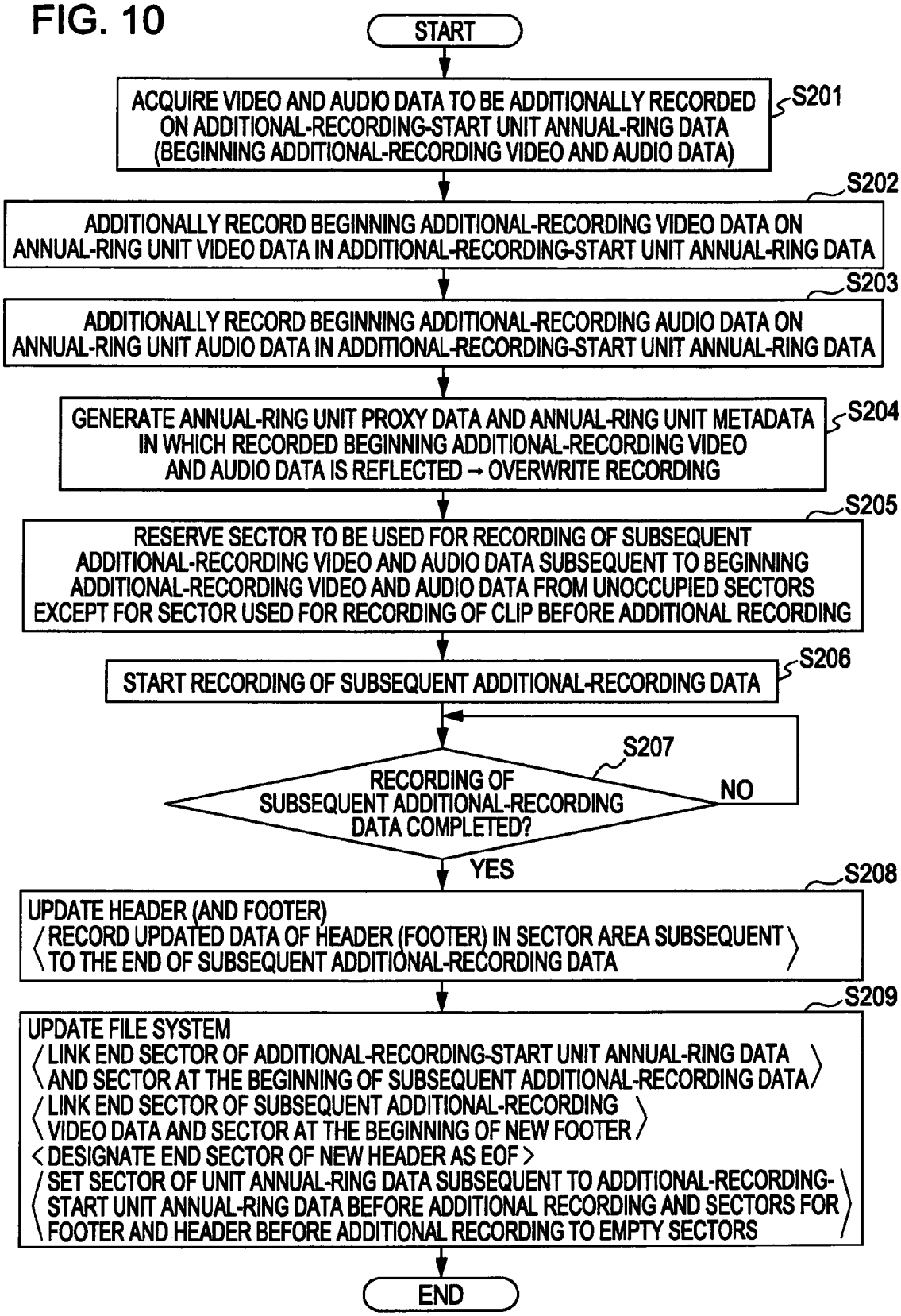
FIG. 10 is a flowchart showing an example of a process performed by the controller according to the recording procedure shown in FIG. 7.

The processes shown in FIGS. 9 and 10 are implemented by the CPU of the microcomputer in the controller 20 by loading a program stored in the storage device constituting the same microcomputer, such as a flash memory or a ROM, and executing the program.

The program is stored by, for example, writing it in the storage device of the microcomputer, as described above, in a manufacturing process or the like. Alternatively, a server for uploading the program may be located on a network, and a network communication function may be provided for the disk recording and reproducing apparatus 10 to allow the disk recording and reproducing apparatus 10 to download the program from the server for installation (including update). The program may also be stored in a removable storage medium, and data of the program read from the storage medium by a device inside or outside the disk recording apparatus 10 may be loaded by the controller 20 of the disk recording apparatus 10 for installation.

First, an example of the process corresponding to the procedure shown in FIG. 6 will be described with reference to the flowchart shown in FIG. 9.

As described above, in assemble editing, as assisting reproduction, the optical disk 11 serving as a master disk is reproduced from a data position preceding an additional recording start position. When the reproduction position reaches the additional recording start position, the disk recording and reproducing apparatus 10 enters the editing recording mode, and the controller 20 executes the processing of step S101.

In the processing of steps S101 to S104, a sequence of additional recording processing to be performed on a unit annual-ring data unit including the additional recording start position (hereinafter referred to as an "additional-recording-start unit annual-ring data unit") is performed. This processing corresponds to the process for the additional-recording-start unit annual-ring data unit described above with reference to FIG. 8.

When step S101 is started, video and audio data serving as new recording data whose output timing from an external device is adjusted so that the beginning of the content to be additionally recorded is positioned at a recording start position of a source clip to be edited has been input from the signal input/output apparatus 31, and has been transferred to the memory controller 17 via the data converter 19. In step S101, therefore, video and audio data to be placed at the beginning of the new recording data (hereinafter referred to as "beginning additional-recording video and audio data"), which is to be additionally recorded within the additional-recording-start unit annual-ring data unit, is acquired. The beginning additional-recording video and audio data is read from the memory 18 by, for example, the memory controller 17.

In step S102, the controller 20 writes video data (beginning additional-recording video data) in the beginning additional-recording video and audio data from an additional recording start position of annual-ring unit video data within the additional-recording-start unit annual-ring data unit on the optical disk 11. In step S103, audio data (beginning additional-recording audio data) in the beginning additional-recording video and audio data is written from an additional recording start position of annual-ring unit audio data within the additional-recording-start unit annual-ring data unit on the optical disk 11.

Alternatively, the annual-ring unit audio data may be written in step S102, and the annual-ring unit video data may be written in step S103.

Then, in step S104, the controller 20 generates annual-ring unit proxy data and annual-ring unit metadata in which the recording result of the beginning additional-recording video and audio data obtained in steps S102 and S103 is reflected. The generated annual-ring unit proxy data and annual-ring unit metadata are overwritten onto data write areas of the annual-ring unit proxy data and annual-ring-unit metadata within the additional-recording-start unit annual-ring data unit on the optical disk 11.

According to the procedure descried above, the additional-recording-start unit annual-ring data unit in which the additionally recorded content is reflected is written in the optical disk 11.

In step S105, the file system management information is referred to, and an empty sector for subsequent additional-recording data is reserved from sectors except for a sector used for the recorded data of the source clip before additional recording. The subsequent additional-recording data is data to be additionally recorded on the optical disk 11 so as to be subsequent to the beginning additional-recording video and audio data as new recording data, and has a structure of a sequence of unit annual-ring data units shown in part (c) of FIG. 8. The process for converting recording data input from the signal input/output apparatus 31 into a sequence of unit annual-ring data units is performed by, for example, the controller 20 by controlling the signal processing section 16.

In step S106, the process for writing and recording the subsequent additional-recording data in the empty sector reserved in step S105 is started. In step S107, the process waits for the recording of the subsequent additional-recording data to be completed. When the recording is completed, the process proceeds to step S108.

In step S108, the process for updating the header according to the obtained additional recording result of the new recording data is performed. The footer is also updated, if necessary. In the following description, it is assumed that both the header and the footer are updated.

Therefore, first, the data of the header and footer of the source clip before additional recording is retrieved from the optical disk 11, and the retrieved data is loaded in an internal memory. The loaded data of the header and footer is updated so as to reflect the current recording result of the new recording data. The updated data of the header and footer is written so as to overwrite the same sector areas as those in which the header and footer are recorded in the source clip before additional recording.

In step S109, the file system management information stored in the optical disk 11 is updated so as to establish a new clip in which the additionally recorded current content of the new recording data is reflected.

The file system management information (link information table) is updated so that, for example, as described above with reference to FIG. 6, first, the file system management information is rewritten so as to link the end sector of the additional-recording-start unit annual-ring data unit and the beginning sector of the subsequent additional-recording data. Further, the end sector of the subsequent additional-recording data is linked with the beginning sector of the same footer as that before additional recording. The end sector of the same header as that before additional recording is designated as the EOF. Therefore, for example, as shown in parts of (b) and (c) of FIG. 6, the new clip is configured such that unit annual-ring data units starting the beginning of the source clip (i.e., the unit annual-ring data unit DAU1) up to the additional-recording-start unit annual-ring data unit, the subsequent additional-recording data, and the updated footer and header written in the sector areas before additional recording are concatenated.

In the source clip before additional recording, the unit annual-ring data unit subsequent to the additional-recording-start unit annual-ring data unit is managed as an empty area.

Next, an example of the process corresponding to the procedure shown in FIG. 7 will be described with reference to the flowchart shown in FIG. 10.

In FIG. 10, the processing of steps S201 to S207 is similar to the processing of steps S101 to S107 described above with reference to FIG. 9.

In step S208, the header and footer are updated so that the data of the header and footer that is rewritten so as to reflect the current recording result of the new recording data is written in the reserved empty sector areas subsequent to the subsequent additional-recording data on the optical disk 11.

In step S209, the file system management information is updated by, first, performing an update so that the end sector of the additional-recording-start unit annual-ring data unit is linked with the beginning sector of the subsequent additional-recording data, which is the same as that in step S109. Other data is updated in a manner different from that in step S109. That is, in step S209, the end sector of the subsequent additional-recording data is linked with the beginning sector of the footer newly recorded in step S208, and the end sector of the header newly recorded in step S208 is designated as the EOF.

In this case, in the source clip before additional recording, the areas in which the unit annual-ring data unit subsequent to the additional-recording-start unit annual-ring data unit, and the data of the original footer and header are recorded are set as empty areas.

Therefore, for example, a new clip with the structure shown in parts (b) and (c) of FIG. 7 is obtained.

In the recording procedure for assemble editing according to the present embodiment described above, even if the recording of new recording data is interrupted due to, for example, stop of power supply for some reasons, substantially the same content in the source clip stored on the master disk (e.g., the optical disk 11) as that before recording of the new recording data (before execution of editing and recording) can be reproduced. That is, data can be protected against interruption of recording.

For example, it is assumed that recording is interrupted during writing of data to the optical disk 11 according to the recording procedure shown in FIG. 6 or 7, namely, at the time when the subsequent additional-recording data (see part (c) of FIG. 6 or 7) is written after completion of the additional recording of the additional-recording-start unit annual-ring data unit. In correspondence with FIG. 9 or 10, during execution of the processing of step S107 or S207, recording is interrupted.

At the interruption time, on the optical disk 11, the beginning additional-recording video and audio data is overwritten onto the additional-recording-start unit annual-ring data unit DAUn−1. However, the additional-recording-start unit annual-ring data unit DAUn and the subsequent unit annual-ring data units, the footer, and the header in the clip before editing are not overwritten and are maintained in the state where the same content as that before editing and recording is written. This is because, for example, as shown in step S105 or S205 shown in FIG. 9 or 10, the remaining sectors are reserved as empty sectors used for the subsequent additional-recording data to prevent the sectors in which the data constituting the clip before editing is recorded from being overwritten. At this time, the processing of steps S109 and S209 has not been performed, and the same content as that before editing is still maintained in the file system management information.

Figure 11:
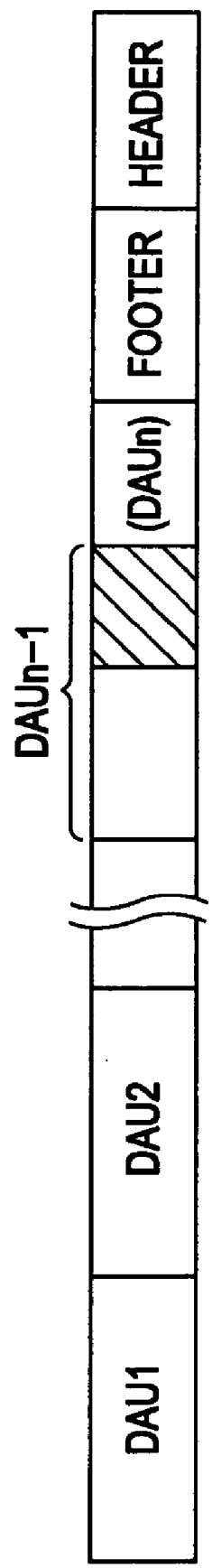
FIG. 11 is a diagram showing an example of content of a source clip protected against interruption of recording of new recording data using assemble editing.

Thereafter, the source clip obtained when the disk recording and reproducing apparatus 10 is turned on is shown in, for example, FIG. 11. That is, unit annual-ring data, a footer, and a header constituting the source clip include data written in the same sectors as those before editing and recording. The recorded content of the additional-recording-start unit annual-ring data unit DAUn−1 is different from that before editing in that the beginning additional-recording video and audio data is overwritten, and the recorded content of the other unit annual-ring data units, footer, and header is the same as that before editing. That is, even if recording is interrupted, data is protected so that substantially the same content of the clip as that before editing is recovered.

As shown in FIG. 11, in the recovered source clip, the additional recording result of the new recording data is reflected only in the additional-recording-start unit annual-ring data unit. This may not cause a problem in actual use.

In this case, during an assemble editing operation, recording is interrupted due to unexpected stop of power supply or the like. In most cases, the operator performs editing again from the same additional recording start position to finally obtain, for example, the editing result shown in parts (b) and (c) of FIG. 6 or 7.

In some cases, recording may be interrupted during writing of the additional-recording-start unit annual-ring data unit. That is, recording is interrupted during the processing of steps S102 to S104 or S202 to S204 shown in FIG. 9 or 10. In these cases, the data newly recorded until the interruption time is left in the overwritten state. However, as described above, it is expected that the assemble editing recording operation is performed again from the same additional recording start position, and, for example, the recording result shown in FIG. 8 is obtained after the editing and recording operation has been completed. Therefore, there arises no problem.

The present invention is not limited to the embodiment descried above.

In the embodiment described above, for example, video data of a moving picture and audio data to be reproduced synchronously with the video data are to be edited. For example, only video data or only audio data may be edited.

While an optical disk-shaped storage medium is used by way of example, an apparatus for performing editing using any other random access storage medium such as a hard disk drive or a semiconductor storage device such as a flash memory may be used.

The foregoing description has been made in the context of a professional editing product. However, there is no special intervention of application of a structure based on the embodiment of the present invention to consumer products such as a consumer video editing product.

It should be understood by those skilled in the art that various modifications, combinations, sub-combinations and alterations may occur depending on design requirements and other factors insofar as they are within the scope of the appended claims or the equivalents thereof.

What is claimed is:

1. A recording control apparatus, comprising:
a first data recording section configured to record a beginning portion of new data in a physical storage area on a randomly accessible storage medium in which a clip was previously recorded, the clip including a data body portion in which data is stored and a management information portion arranged subsequent to the data body portion, the data body portion being a sequence of units segmented according to a predetermined data size, the data being divided among the segmented units,
wherein data recording on the storage medium is performed such that the beginning portion of the new data is recorded in a leading additional recording area that extends from an additional recording start position within a predetermined one of the segmented units of the previously recorded clip to an end position of the one of the segmented units of the previously recorded clip, the beginning portion of the new data having a data size equal to a data size of the leading additional recording area;
a second data recording section configured to record a subsequent portion of the new data as further data divided among additional segmented units in another physical storage area on the storage medium other than the physical storage area in which the previously recorded clip is recorded;

a management information recording section configured to update the management information portion to reflect the new data recorded by the first data recording section and the second data recording section so as to link the end position of the one of the segmented units of the previously recorded clip in which the beginning portion of the new data is recorded and a beginning position of the another physical storage area on the storage medium in which the subsequent portion of the new data is recorded, and to physically record data indicating the updated management information portion in the storage medium; and a storage medium managing section configured to manage content stored in the storage medium so that the new data that has been recorded by the first data recording section and the second data recording section is included within an extended data body portion that starts at the beginning of the data body portion of the previously recorded clip and ends at the end of the recorded new data.

2. The recording control apparatus according to claim 1, wherein the management information recording section updates the data indicating the updated management information portion by overwriting a storage area on the storage medium in which prior management information portion was physically recorded that reflected the previously recorded clip.

3. The recording control apparatus according to claim 1, wherein the management information recording section records the data indicating the updated management information portion in the another storage area on the storage medium other than the physical storage area in which the previously recorded clip was recorded.

4. A recording control method, comprising:

recording a beginning portion of new data in a physical storage area on a randomly accessible storage medium in which a clip was previously recorded, the clip including a data body portion in which data is stored and a management information portion arranged subsequent to the data body portion, the data body portion being a sequence of units segmented according to a predetermined data size, the data being divided among the segmented units, wherein data recording on the storage medium is performed such that the beginning portion of the new data is recorded in a leading additional recording area that extends from an additional recording start position within a predetermined one of the segmented units of the previously recorded clip to an end position of the one of the segmented units of the previously recorded clip, the beginning portion of the new data having a data size equal to a data size of the leading additional recording area;

recording a subsequent portion of the new data as further data divided among additional segmented units in another physical storage area on the storage medium other than the physical storage area in which the previously recorded clip is recorded;

physically recording data indicating an updated management information portion in the storage medium, the updated management information portion being obtained by updating the management information portion to reflect the additionally recorded new data so as to link the end position of the one of the segmented units of the previously recorded clip in which the beginning portion of the new data is recorded and a beginning position of the another physical storage area on the storage medium in which the subsequent portion of the new data is recorded; and managing content stored in the storage medium so that the new data is included within an extended data body portion that starts at the beginning of the data body portion of the previously recorded clip and ends at the end of the recorded new data.

5. The recording control method according to claim 4, wherein the data including the management information portion is updated by overwriting a storage area on the storage medium in which prior management information was physically recorded that reflected the previously recorded clip.

6. The recording control method according to claim 4, wherein the data indicating the updated management information portion is recorded in the another storage area on the storage medium other than the physical storage area in which the previously recorded clip was recorded.

7. The recording control apparatus according to claim 1, wherein the updated management information portion links an end position of the another physical storage area on the storage medium in which the subsequent portion of the new data is recorded and a beginning position of a footer that follows the end position of the one of the segmented units of the previously recorded clip in which the beginning portion of the new data is recorded.

8. The recording control method according to claim 4, wherein the updated management information portion links an end position of the another physical storage area on the storage medium in which the subsequent portion of the new data is recorded and a beginning position of a footer that follows the end position of the one of the segmented units of the previously recorded clip in which the beginning portion of the new data is recorded.

* * * * *